(12) United States Patent
Yokota et al.

(10) Patent No.: US 10,503,722 B2
(45) Date of Patent: Dec. 10, 2019

(54) LOG MANAGEMENT APPARATUS AND LOG MANAGEMENT METHOD

(71) Applicant: FUJITSU LIMITED, Kawasaki-shi, Kanagawa (JP)

(72) Inventors: Hiroki Yokota, Numazu (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 57 days.

(21) Appl. No.: 16/003,153

(22) Filed: Jun. 8, 2018

(65) Prior Publication Data

US 2018/0365280 A1    Dec. 20, 2018

(30) Foreign Application Priority Data

Jun. 14, 2017 (JP) .................................. 2017-117069

(51) Int. Cl.
*G06F 9/46* (2006.01)
*G06F 16/23* (2019.01)
*G06F 9/52* (2006.01)

(52) U.S. Cl.
CPC ............ *G06F 16/2358* (2019.01); *G06F 9/52* (2013.01)

(58) Field of Classification Search
None
See application file for complete search history.

(56) References Cited

U.S. PATENT DOCUMENTS

2016/0011922 A1    1/2016  Torino

FOREIGN PATENT DOCUMENTS

JP    2016-18470    2/2016

*Primary Examiner* — Gregory A Kessler
(74) *Attorney, Agent, or Firm* — Fujitsu Patent Center

(57) ABSTRACT

A log management apparatus includes a memory configured to store log information and identification information in association with each other, and a processor configured to store, in association with first identification information in the memory, first log information output, before a semaphore returns to an initial value but after the semaphore decreases from the initial value, from a program employing the semaphore, associate the first identification information with information relative to deletion of the log information when the semaphore has returned to the initial value, and perform deletion of the first log information among the log information stored in the memory in accordance with the first identification information associated with the information.

13 Claims, 13 Drawing Sheets

FIG. 6A

```
EXECUTION PROGRAM NAME SEMAPHORE A PERIOD ID: 0
RESOURCE OBTAIN LOG
```

FIG. 6B

```
EXECUTION PROGRAM NAME SEMAPHORE A PERIOD ID: 0
LOG TEXT
```

FIG. 6C

```
MANAGEMENT PROCESS NAME SEMAPHORE A PERIOD ID: 0
RESOURCE RETURN LOG
```

LOG MANAGEMENT APPARATUS AND LOG MANAGEMENT METHOD

CROSS-REFERENCE TO RELATED APPLICATION

This application is based upon and claims the benefit of priority of the prior Japanese Patent Application No. 2017-117069, filed on Jun. 14, 2017, the entire contents of which are incorporated herein by reference.

FIELD

The embodiments discussed herein are related to a technique for managing a log.

BACKGROUND

When an abnormality such as a failure to release a resource by a program employing a semaphore occurs, an operation manager has to promptly identify a cause of the abnormality in order not to allow the abnormality to affect a service provided for a user. In obtained trace information (log information), however, there are a large number of pieces of trace information that have been obtained while the program has been operating normally. It might therefore take a long time for the operation manager to identify trace information including information regarding the abnormality during investigation of the cause of the abnormality. In addition, because memory capacity for storing trace information is limited, the obtained trace information might not be stored for a sufficient period of time.

For this reason, older trace information is removed from a storage unit. In addition, in order to efficiently obtain trace information used for an investigation, a method has been proposed in which if it is determined that all monitoring targets are not using a certain resource, trace information is removed from the storage unit. Japanese Laid-open Patent Publication No. 2016-18470, for example, discloses one of such techniques.

SUMMARY

According to an aspect of the invention, a log management apparatus includes a memory configured to store log information and identification information in association with each other, and a processor configured to store, in association with first identification information in the memory, first log information output, before a semaphore returns to an initial value but after the semaphore decreases from the initial value, from a program employing the semaphore, associate the first identification information with information relative to deletion of the log information when the semaphore has returned to the initial value, and perform deletion of the first log information among the log information stored in the memory in accordance with the first identification information associated with the information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A to 6C are diagrams illustrating examples of log information stored in a log file according to the first embodiment;

DESCRIPTION OF EMBODIMENTS

Figure 1:
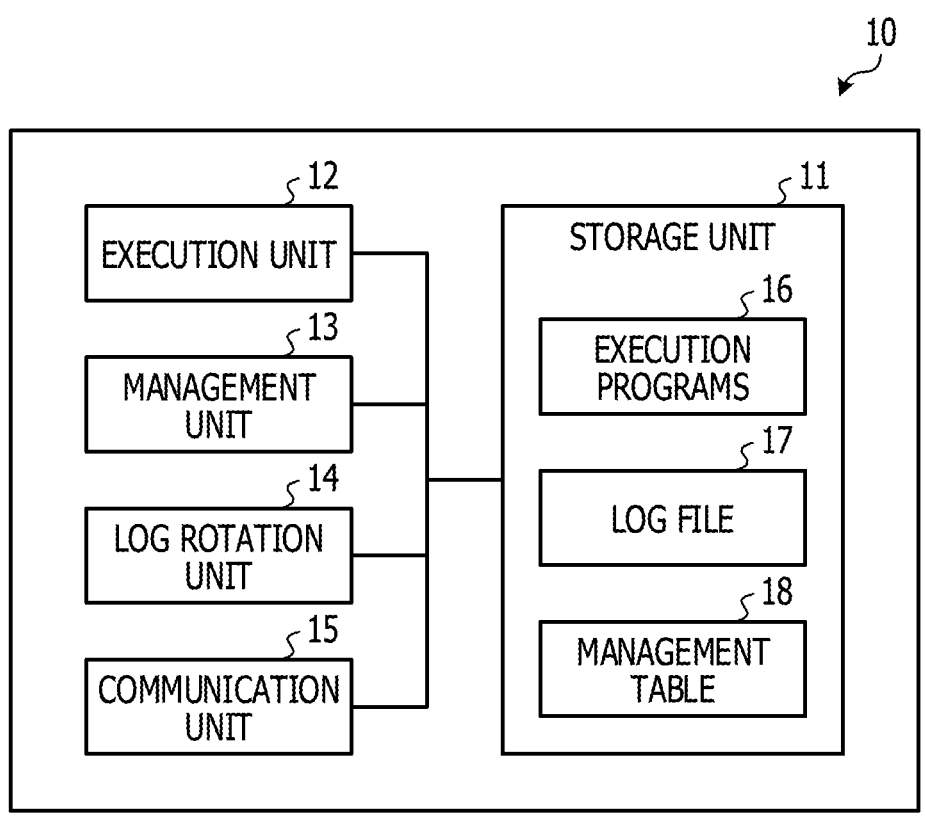
FIG. 1 is a diagram illustrating an example of the functional configuration of an information processing apparatus according to first and second embodiments.

When an execution program for scientific technique calculation is executed, however, an enormous amount of time, namely one week or more, for example, might be taken to complete the calculation. If older trace information is removed in this case as in the example of the related art, the removed trace information might include information to be used to identify a cause of a possible malfunction.

In addition, in the example of the related art, an environment is assumed in which all resources are managed by a single component and obtaining and releasing of resources are monitored. In a distributed system capable of performing a large number of parallel jobs, on the other hand, obtaining and releasing of resources might not be explicitly positioned for each job. When a certain shared file is simply updated, for example, an error in the update performed for a job might affect a next job, and it is difficult to singlehandedly manage all the resources.

Embodiments will be described hereinafter with reference to the accompanying drawings. Components having substantially the same functions are given the same reference numerals herein, and redundant description thereof is omitted.

Functional Configuration of Information Processing Apparatus

First, an example of the functional configuration of an information processing apparatus 10 according to first and second embodiments will be described hereinafter with reference to FIG. 1. FIG. 1 illustrates an example of the functional configuration of the information processing apparatus 10 according to the present embodiments. The information processing apparatus 10 according to the present embodiments is achieved by a computer (hereinafter referred to as a "node") such as a server, a personal computer, a tablet terminal, a smartphone, a personal digital assistant (PDA), or a head-mount display (HMD) and is an example of a log management apparatus. The information processing apparatus 10 according to the present embodiments may be a cluster system constructed by connecting a plurality of computers using a high-speed network or the like.

The information processing apparatus 10 according to the present embodiments includes a storage unit 11, an execution unit 12, a management unit 13, a log rotation unit 14, and a communication unit 15.

The storage unit 11 stores execution programs 16, a log file 17, and a management table 18. The execution programs 16 are programs for executing jobs scheduled by, for example, a job scheduler. The execution programs 16 include execution programs for scientific technique calculation and execution programs in various fields and are executed by the execution unit 12.

The execution unit 12 stores log information in the log file 17 while associating a period identifier (ID) assigned to the log information with the log information. Log information is history information at a time when an execution program 16 employing a semaphore has been executed. The log file 17 stores various pieces of data such as, at least, execution program names, semaphore names, period IDs, and logs. When storing log information in the log file 17 of the storage unit 11, the execution unit 12 communicates with the management unit 13 and associates, with the log information, a period ID obtained from the management unit 13.

A semaphore has, as an initial value thereof, the number of available shared resources for executing an execution program 16. The semaphore is decreased by one when an execution program 16 executed by the execution unit 12 has obtained a resource and increased by one when an execution program 16 executed by the execution unit 12 has returned a resource. After all resources are returned, the semaphore returns to the initial value. The semaphore may be managed by the execution unit 12 or the management unit 13.

If an execution program 16 (execution process) ends without returning an obtained resource, for example, the semaphore becomes insufficient, and the process no longer proceeds. If all resources are returned and the initial value is achieved, on the other hand, it may be seen that all resources that have been obtained have been normally returned.

When the semaphore has returned to the initial value, therefore, it may be determined that the semaphore has been normally managed for past job execution processes. That is, when the semaphore has returned to the initial value, it may be determined that log information regarding past job execution programs is log information irrelevant to an analysis of a cause of a possible malfunction.

When the semaphore has returned to the initial value, therefore, the management unit 13 invalidates a period ID corresponding to a period assigned to log information when past job execution programs have been executed. The management unit 13 then issues a period ID corresponding to a new period managed in association with the semaphore and validates the period ID corresponding to the new period.

The log rotation unit 14 performs log rotation each time a certain period of time has elapsed, that is, selects log information as a removal candidate when the certain period of time (save period) has elapsed. The log rotation unit 14 asks the management unit 13 whether a period ID corresponding to log information selected as a removal candidate is valid or invalid, and removes only log information corresponding to a period ID determined to be invalid.

When removing, during log rotation, log information whose save period has expired after the log information is stored in the log file 17, the log rotation unit 14 might undesirably remove log information to be used to analyze a cause of a possible malfunction. In the present embodiments, on the other hand, when the semaphore has returned to the initial value, the management unit 13 invalidates a period ID assigned to log information at a time when past job execution programs have been executed. As a result, when a period ID is invalid, it may be determined that log information to which the period ID is assigned is log information irrelevant to an analysis of a cause of a possible malfunction.

In the present embodiments, therefore, only log information corresponding to a period ID determined to be invalid among period IDs corresponding to log information selected by the log rotation unit 14 as removal candidates is removed. As a result, log information to be used to analyze a possible malfunction is not removed.

A period ID is an example of a period identifier assigned to log information. The management unit 13 stores, in the management table 18, information indicating whether a period indicated by a period ID is valid or invalid for each resource.

A program executed by the management unit 13 is also called a "management process". A program executed by the log rotation unit 14 is also called a "log rotation process". The execution programs 16 are used to execute jobs employing a semaphore. In the first embodiment, the execution unit 12 that executes the execution programs 16, the management unit 13 that executes the management process, and the log rotation unit 14 that executes a log rotation process operate in combination with one another at the same node.

The communication unit 15 enables the information processing apparatus 10 having such a configuration to communicate data with other devices.

Hardware Configuration

Figure 2:
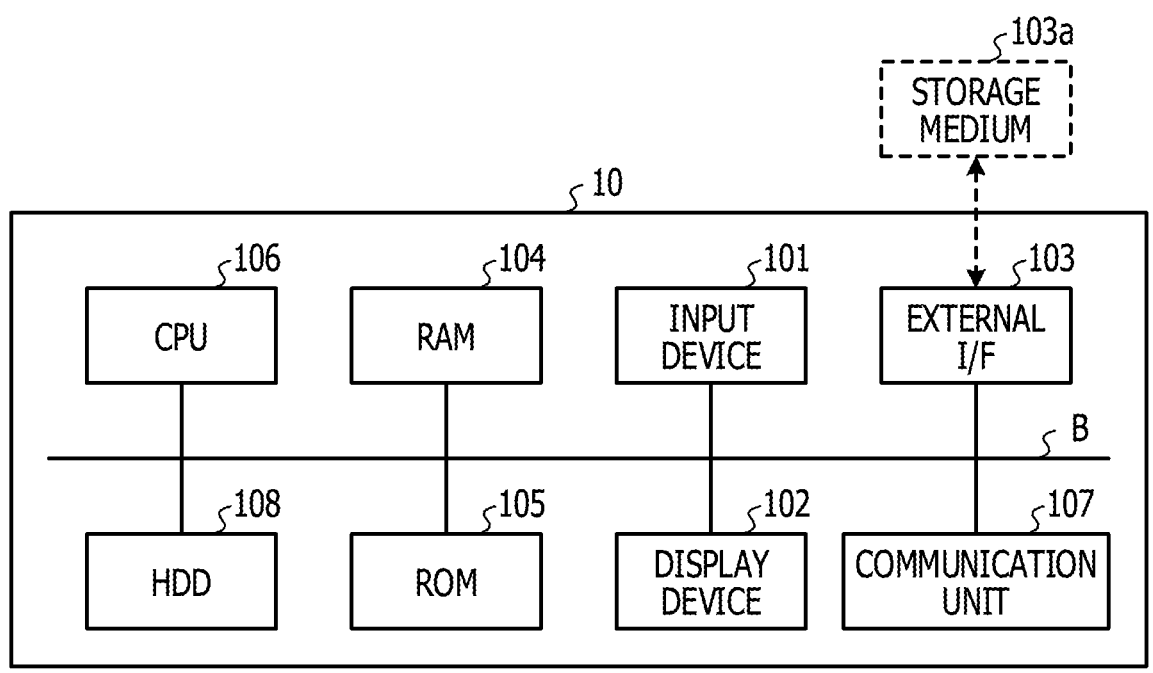
FIG. 2 is a diagram illustrating an example of the hardware configuration of the information processing apparatus according to the first and second embodiments.

Next, an example of the hardware configuration of the information processing apparatus 10 according to the first and second embodiments will be described with reference to FIG. 2. FIG. 2 illustrates an example of the hardware configuration of the information processing apparatus 10 according to the present embodiments. The information processing apparatus 10 includes an input device 101, a display device 102, an external interface 103, a random-access memory (RAM) 104, a read-only memory (ROM) 105, a central processing unit (CPU) 106, a communication interface 107, and a hard disk drive (HDD) 108. These components are connected to one another by a bus B.

The input device 101 includes a keyboard, a mouse, or the like and is used to input control signals to the information processing apparatus 10. The display device 102 includes a display such as a liquid crystal display (LCD) monitor, a printer, a cathode ray tube (CRT), or the like and outputs various processing results. The communication interface 107 connects the information processing apparatus 10 to a network. The information processing apparatus 10 communicates with other devices (other nodes and the like) through the communication interface 107.

The HDD 108 is a nonvolatile storage device storing programs and data. The programs and the data include basic software for controlling the entirety of the information processing apparatus 10 and application software. The HDD 108 may store, for example, various databases and programs.

The external interface 103 is an interface with external apparatuses. The external apparatuses include a storage medium 103a. The information processing apparatus 10 reads data from and/or writes data to the storage medium 103a through the external interface 103. The storage medium 103a is a compact disc (CD), a digital versatile disc (DVD), a secure digital (SD) memory card, a universal serial bus (USB) memory, or the like.

The ROM 105 is a nonvolatile semiconductor memory capable of maintaining internal data even after power is turned off. The ROM 105 stores programs and data such as network settings. The RAM 104 is a volatile semiconductor memory temporarily holding programs and data. The CPU 106 is a processing device that reads programs and data from the HDD 108 or the ROM 105 to the RAM 104 and that performs processes to control the entirety of the information processing apparatus 10 and achieve functions.

With this configuration, the CPU 106 of the information processing apparatus 10 according to the present embodiments performs a process at a time of generation of a semaphore, a process at a time of outputting of a log, and the log rotation process using job execution programs and other programs stored in the RAM 104, the ROM 105, and the HDD 108, for example, in order determined by the job scheduler. Information stored in the log file 17 and the management table 18 may be stored in the RAM 104, the HDD 108, or a cloud server connected to the information processing apparatus 10 through the network.

Functions of the storage unit 11 may be achieved, for example, by the RAM 104, the ROM 105, and the HDD 108. Functions of the communication unit 15 may be achieved, for example, by the communication interface 107.

First Embodiment

In the first embodiment, the execution programs 16 executed by the execution unit 12, the management process performed by the management unit 13, and the log rotation process performed by the log rotation unit 14 operate in combination with one another at the same node.

Process at Time of Generation of Semaphore

Figure 3:
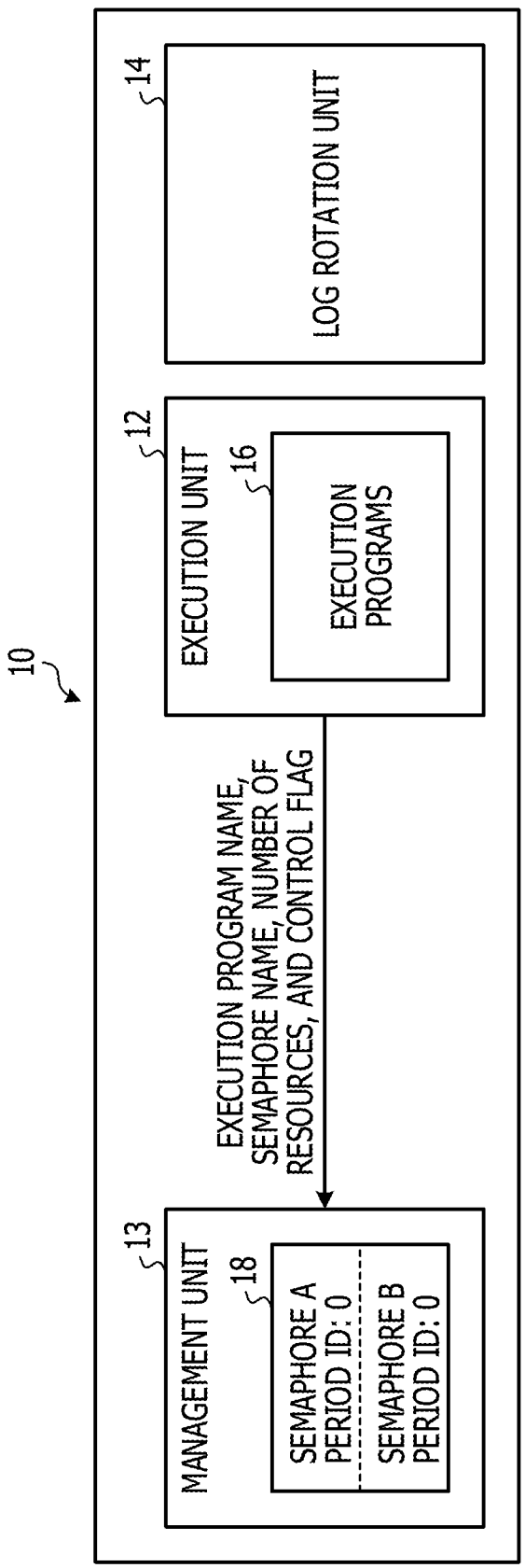
FIG. 3 is a diagram illustrating an example of a process at a time of generation of a semaphore according to the first embodiment.

Next, an example of a process at a time of generation of a semaphore according to the first embodiment will be described with reference to FIG. 3. FIG. 3 is a diagram illustrating an example of the process at a time of generation of a semaphore according to the first embodiment. As illustrated in FIG. 3, the execution unit 12 executes an execution program 16 employing a semaphore and, after the semaphore is generated, transmits an execution program name, a semaphore count name (hereinafter referred to as a "semaphore name"), the number of resources, and a control flag to the management unit 13. At this time, "semaphore generated" is set to the transmitted control flag.

The management unit 13 stores the execution program name, the semaphore name, and the number of resources in the management table 18 and issues a new period ID. In the example of the management table 18 illustrated in FIG. 3, the management unit 13 stores a semaphore name of "semaphore A" and a corresponding period ID of "0". The number of resources is stored as an initial value of the semaphore.

Process at Time of Outputting of Log (Obtaining of Resource)

Figure 4:
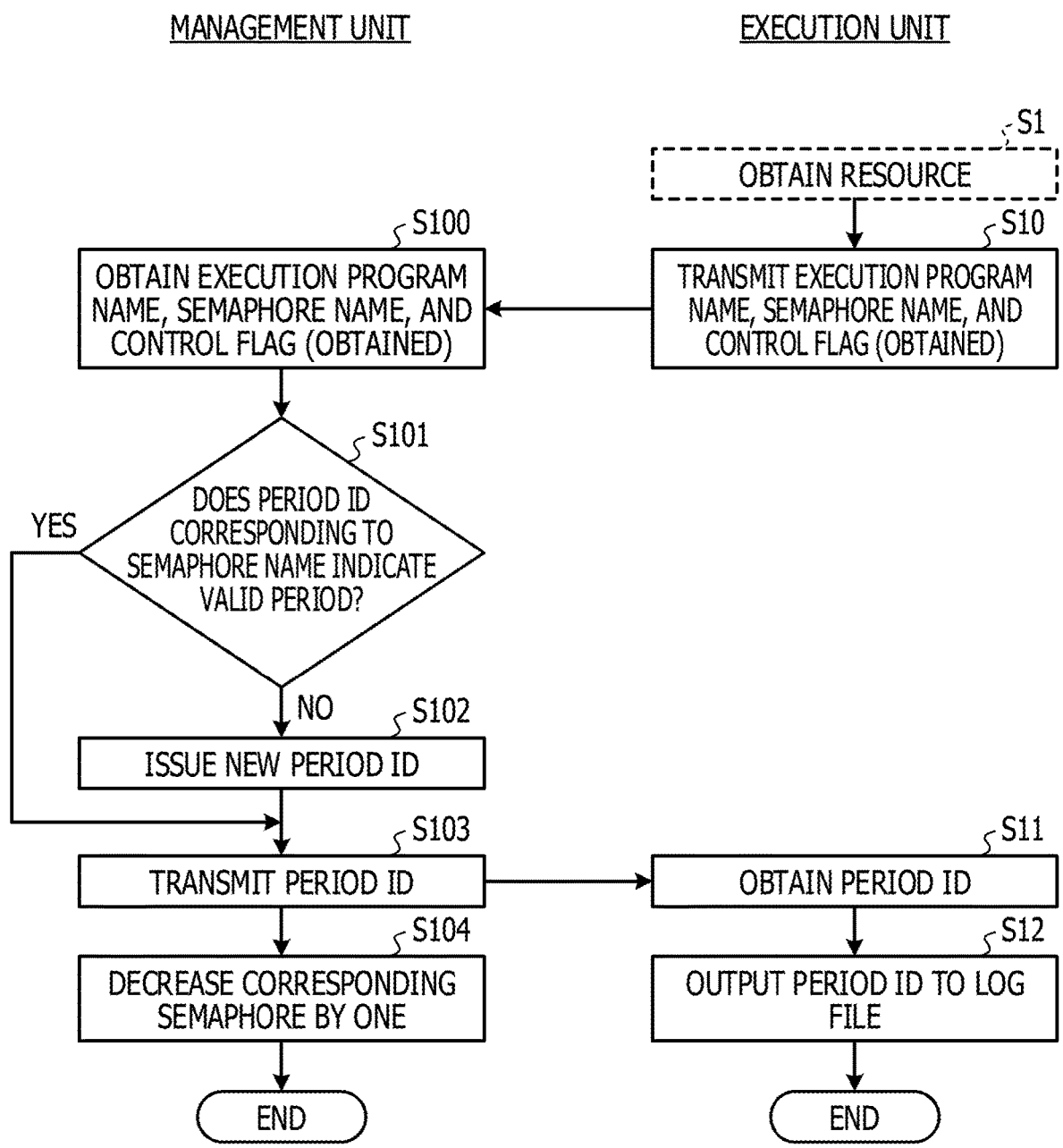
FIG. 4 is a flowchart illustrating an example of a process at a time of outputting of a log (obtaining of a resource) according to the first embodiment.
Figure 5:
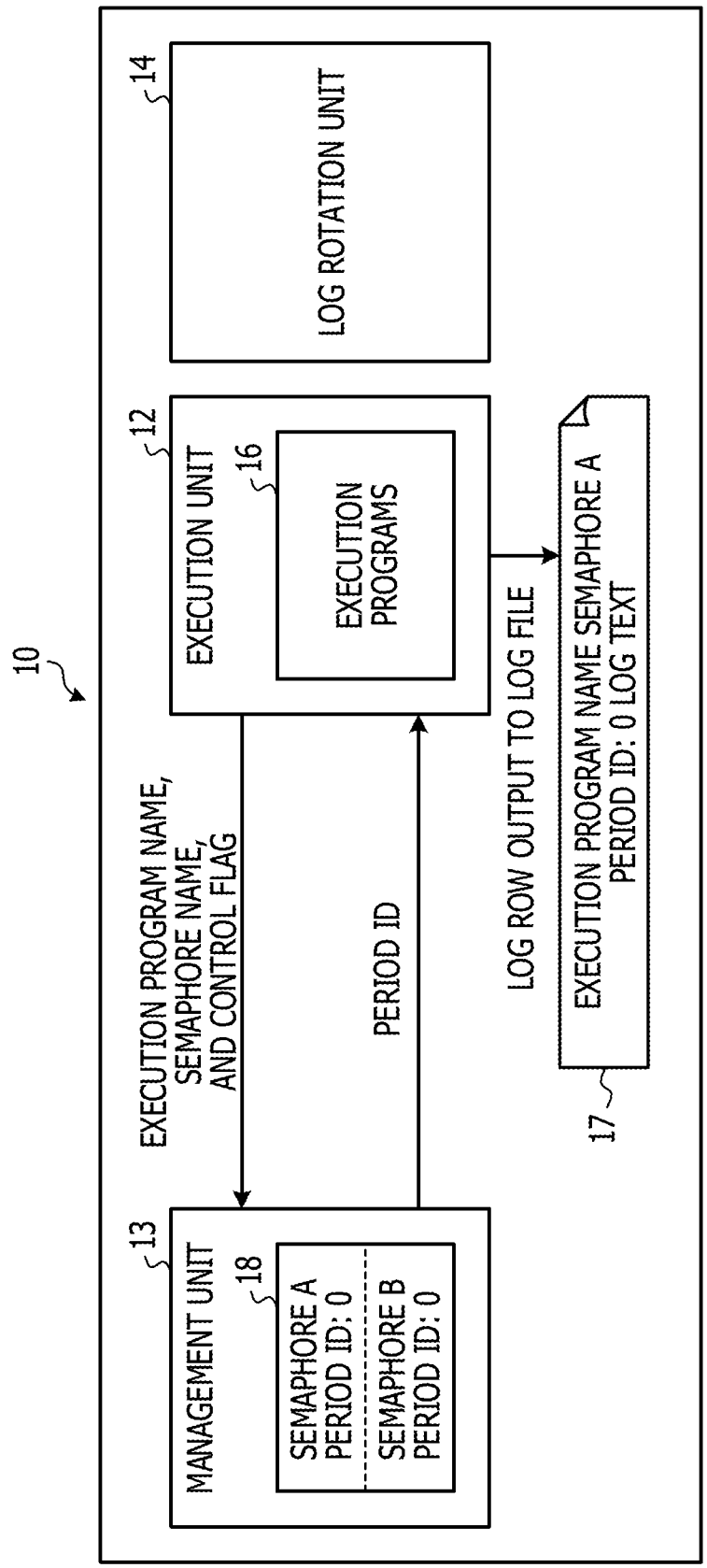
FIG. 5 is a diagram illustrating the example of the process at a time of outputting of a log according to the first embodiment.

Next, an example of a process at a time of outputting of a log (obtaining of a resource) according to the first embodiment will be described with reference to FIGS. 4 and 5. FIG. 4 is a flowchart illustrating an example of the process at a time of outputting of a log (obtaining of a resource) according to the first embodiment. FIG. 5 is a diagram illustrating an example of the process at a time of outputting of a log according to the first embodiment.

The process at a time of outputting of a log (obtaining of a resource) illustrated in FIG. 4 starts when a resource has been obtained in order to execute an execution program 16 (step S1). The execution unit 12 sets "resource obtained" to a control flag and transmits an execution program name, a semaphore name, and a control flag ("resource obtained") to the management unit 13 (step S10).

The management unit 13 obtains the execution program name, the semaphore name, and the control flag ("resource obtained") transmitted from the execution unit 12 (step S100). This processing is indicated in FIG. 5 by an arrow extending from the execution unit 12 to the management unit 13.

In FIG. 4, next, the management unit 13 checks the obtained execution program name and semaphore name and determines whether a period ID corresponding to the obtained semaphore name indicates a valid period (step S101). The management unit 13 refers to the management table 18, checks the period ID corresponding to the obtained semaphore name, and makes the determination.

In the present embodiment, it is assumed that the semaphore name obtained by the management unit 13 is "semaphore A". After issuing a period ID for a semaphore, the management unit 13 sets "0" to the period ID and increases the period ID by one each time the semaphore returns to the initial value. When the period ID is larger than "0", log information whose period ID is "0" is invalid.

At this time, the management unit 13 has set "0" to the period ID of the obtained semaphore A in the management table 18 illustrated in FIG. 5. That is, at this time, the management unit 13 determines that the period ID of the semaphore A indicates a valid period since the period ID is "0". The management unit 13 proceeds to step S103 and transmits, to the execution unit 12, the period ID for which the determination has been made. If determining that the period ID corresponding to the semaphore does not indicate a valid period, on the other hand, the management unit 13 proceeds to step S102 and issues a new period ID. The management unit 13 then transmits the new period ID to the execution unit 12 (step S103). In the present embodiment, when a new period ID is issued, a period ID may be increased by one. Alternatively, when a new period ID is issued, a period ID itself may be changed. The management unit 13 decreases the corresponding semaphore by one (step S104) and ends the process. The semaphore is decreased by one when a resource has been obtained and increased by one when a resource has been returned. The semaphore is used to determine whether the number of resources has been returned to an initial value.

The execution unit 12 stores the period ID transmitted from the management unit 13 in the log file 17 while associating the period ID with the semaphore name (step S12) and ends the process. FIG. 5 illustrates an example in which the management unit 13 transmits the period ID to the execution unit 12 and the execution unit 12 stores the log information in the log file 17 while associating the period ID with the log information, the execution program name, and the semaphore name. As a result of the process at a time of outputting of a log (obtaining of a resource) illustrated in FIG. 4, a log row having an example of a format "execution program name semaphore A period ID: resource obtain log" illustrated in FIG. 6A is output to the log file 17. As a result, the period ID is associated with the log information including the execution program name and the semaphore name and stored.

Process at Time of Outputting of Log (Inquiry about Period ID)

Figure 7:
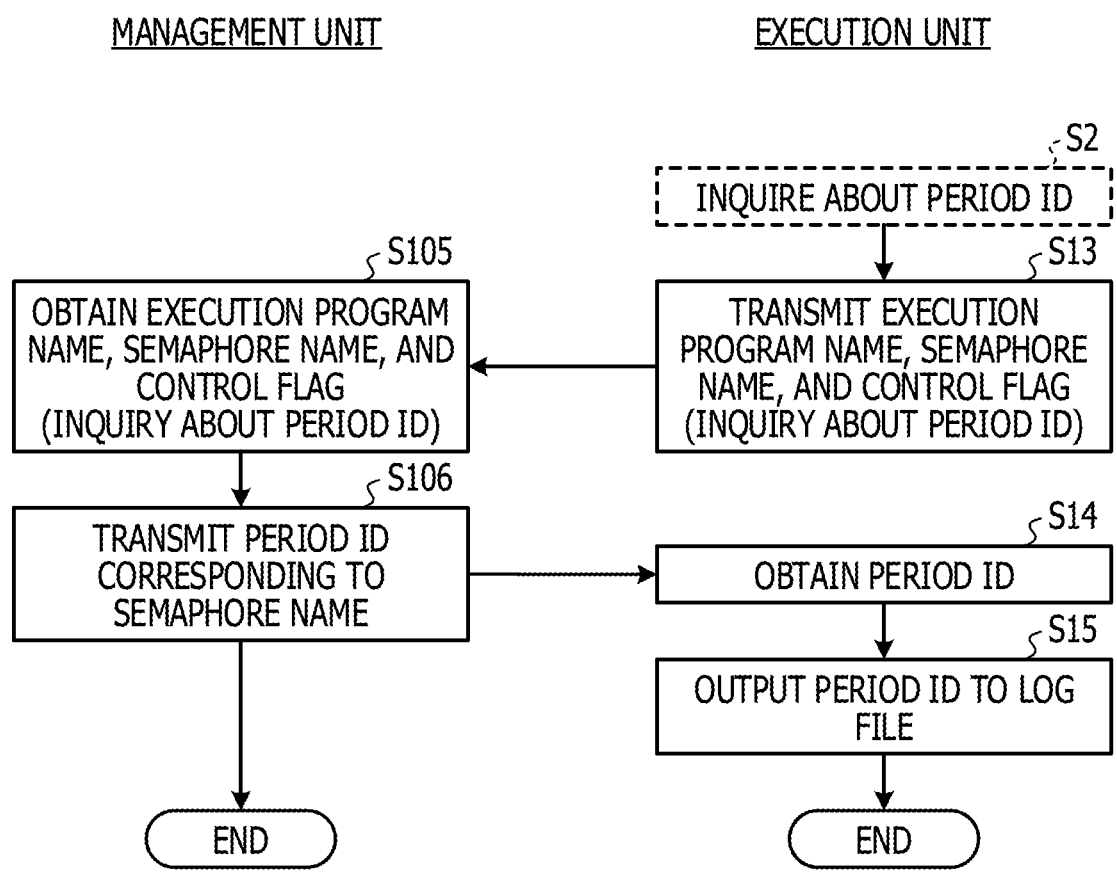
FIG. 7 is a flowchart illustrating an example of a process at a time of outputting of a log (inquiry about a period ID) according to the first embodiment.

Next, an example of a process at a time of outputting of a log (inquiry about a period ID) according to the first embodiment will be described with reference to FIG. 7. FIG. 7 is a flowchart illustrating an example of the process at a time of outputting of a log (inquiry about a period ID) according to the first embodiment.

In the process at a time of outputting of a log (inquiry about a period ID), the execution unit 12 executes an execution program 16 to inquire about a period ID (step S2), and "inquiry about period ID" is set to the control flag. The execution unit 12 transmits an execution program name, a semaphore name, and the control flag ("inquiry about period ID") to the management unit 13 (step S13).

The management unit 13 obtains the execution program name, the semaphore name, and the control flag ("inquiry about period ID") transmitted from the execution unit 12 (step S105). Next, the management unit 13 checks the obtained semaphore name, refers to the management table 18, transmits a period ID corresponding to the obtained semaphore name to the execution unit 12 (step S106), and ends the process.

The execution unit 12 obtains the period ID (step S14), outputs the period ID to the log file 17 (step S15), and ends the process. As a result, in the present embodiment, a log row having an example of a format "execution program name semaphore A period ID: 0 log text" illustrated in FIG. 6B is output to the log file 17.

Process at Time of Outputting of Log (Returning of Resource)

Figure 8:
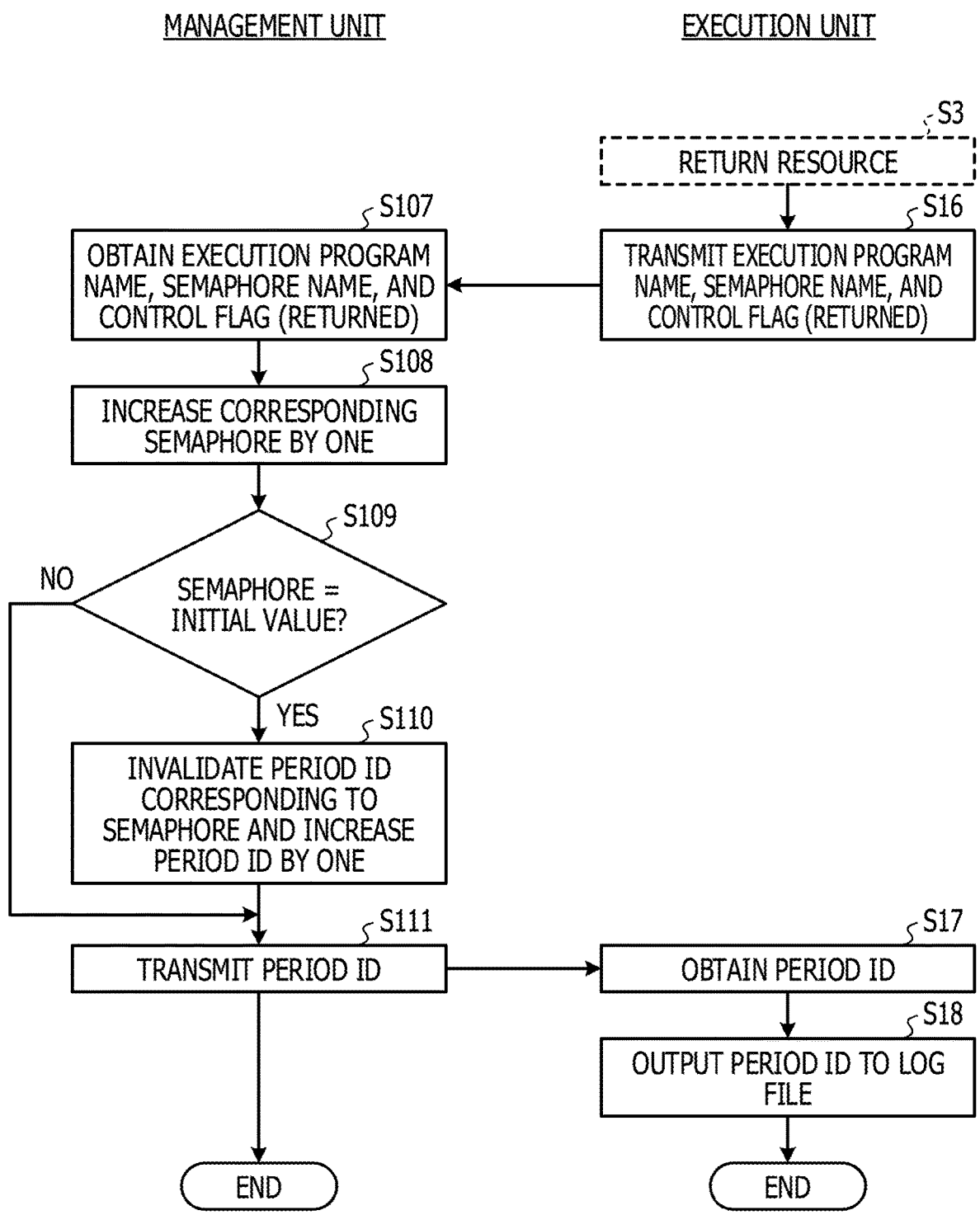
FIG. 8 is a flowchart illustrating an example of a process at a time of outputting of a log (returning of a resource) according to the first embodiment.

Next, an example of a process at a time of outputting of a log (returning of a resource) according to the first embodiment will be described with reference to FIG. 8. FIG. 8 is a flowchart illustrating an example of the process at a time of outputting of a log (returning of a resource) according to the first embodiment.

In the process at a time of outputting of a log (returning of a resource) illustrated in FIG. 8, if a resource is returned after execution of an execution program 16 is completed (step S3), the execution unit 12 sets "resource returned" to a control flag and transmits an execution program name, a semaphore name, and the control flag ("resource returned") to the management unit 13 (step S16).

The management unit 13 obtains the execution program name, the semaphore name, and the control flag ("resource returned") (step S107). Next, the management unit 13 increases a corresponding semaphore by one (step S108). Next, the management unit 13 determines whether the semaphore is an initial value (step S109). If the semaphore is the initial value, the management unit 13 determines that the number of resources has returned to an initial state. If the execution unit 12 determines whether the semaphore is the initial value and if so, the execution unit 12 may notify the management unit 13 that the semaphore is the initial value.

If determining that the semaphore has returned to the initial value, the management unit 13 invalidates (outside a valid period) a period ID corresponding to the semaphore stored in the management table 18 and issues a new period ID (step S110). The management unit 13 increases the period ID by one to set "1" to as the new period ID. At this time, a period ID for which "1" is set is valid, and a period ID for which "0" is set is invalid.

Next, the management unit 13 transmits the new period ID to the execution unit 12 (step S111) and ends the process. In the present embodiment, the period ID is increased by one, and whether the period ID is valid or invalid can be determined. In the present embodiment, the period ID is increased when a resource has been returned or generated.

If determining in step S109 that the semaphore is not the initial value, on the other hand, the management unit 13 transmits the current period ID to the execution unit 12 (step S111) and ends the process.

The execution unit 12 obtains the period ID transmitted from the management unit 13 (step S17), outputs the period ID to the log file 17 (step S18), and ends the process. As a result, in the present embodiment, a log row having an example of a format "management process name semaphore A period ID: 0 resource return log" illustrated in FIG. 6C is output to the log file 17.

As described above, when a resource has been returned, the management unit 13 transmits a current period ID to the execution unit 12 if a semaphore has not returned to an initial value. If the semaphore has returned to the initial value, the management unit 13 increases the period ID by one and transmits the period ID to the execution unit 12. Whether the period ID is valid or invalid, therefore, may be determined based on the value of the period ID. Log information corresponding to an invalid period ID is removed, and log information corresponding to a valid period ID remains in the log file 17.

Log Rotation Process

Figure 9:
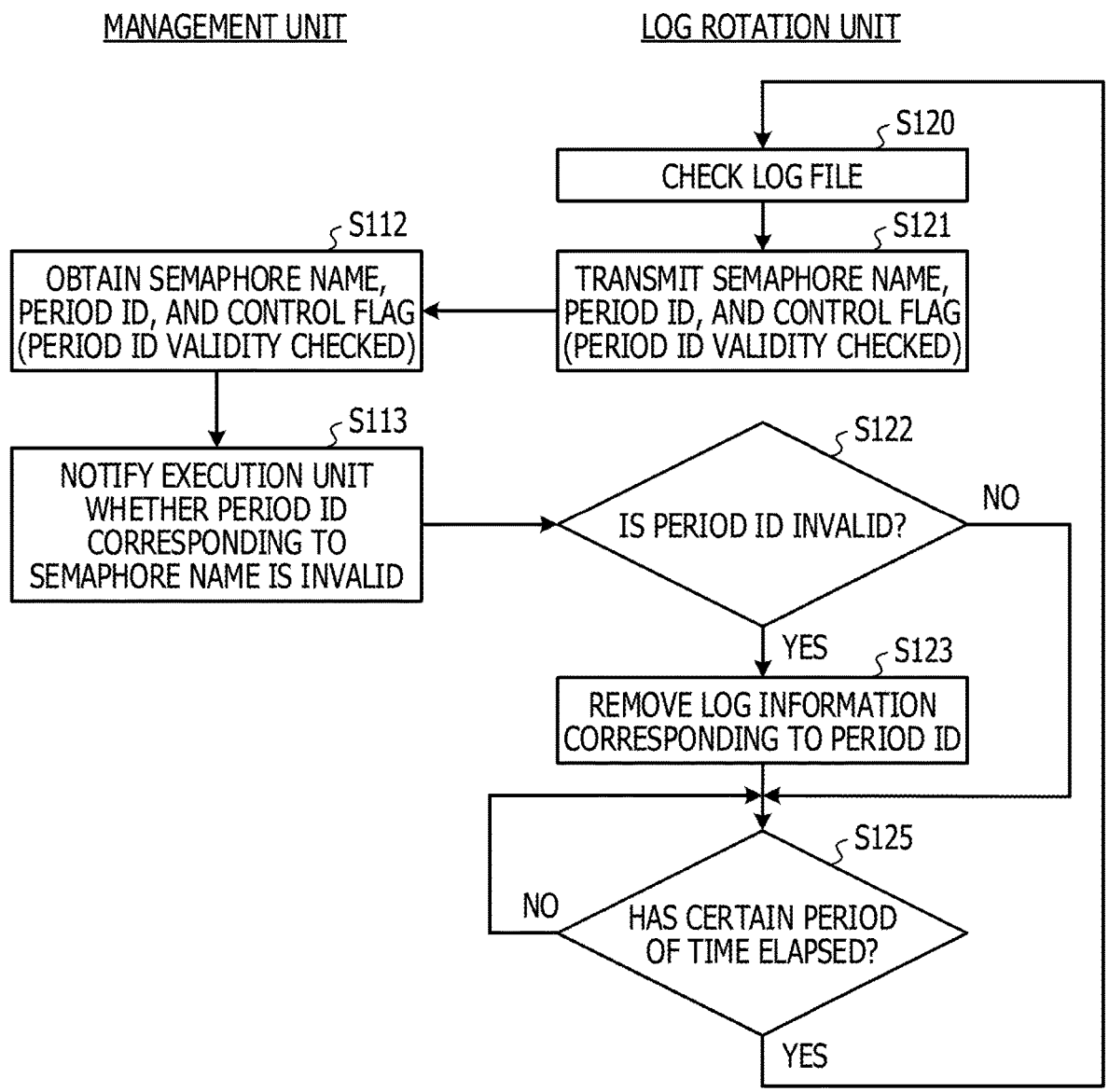
FIG. 9 is a flowchart illustrating an example of a log rotation process according to the first embodiment.
Figure 10:
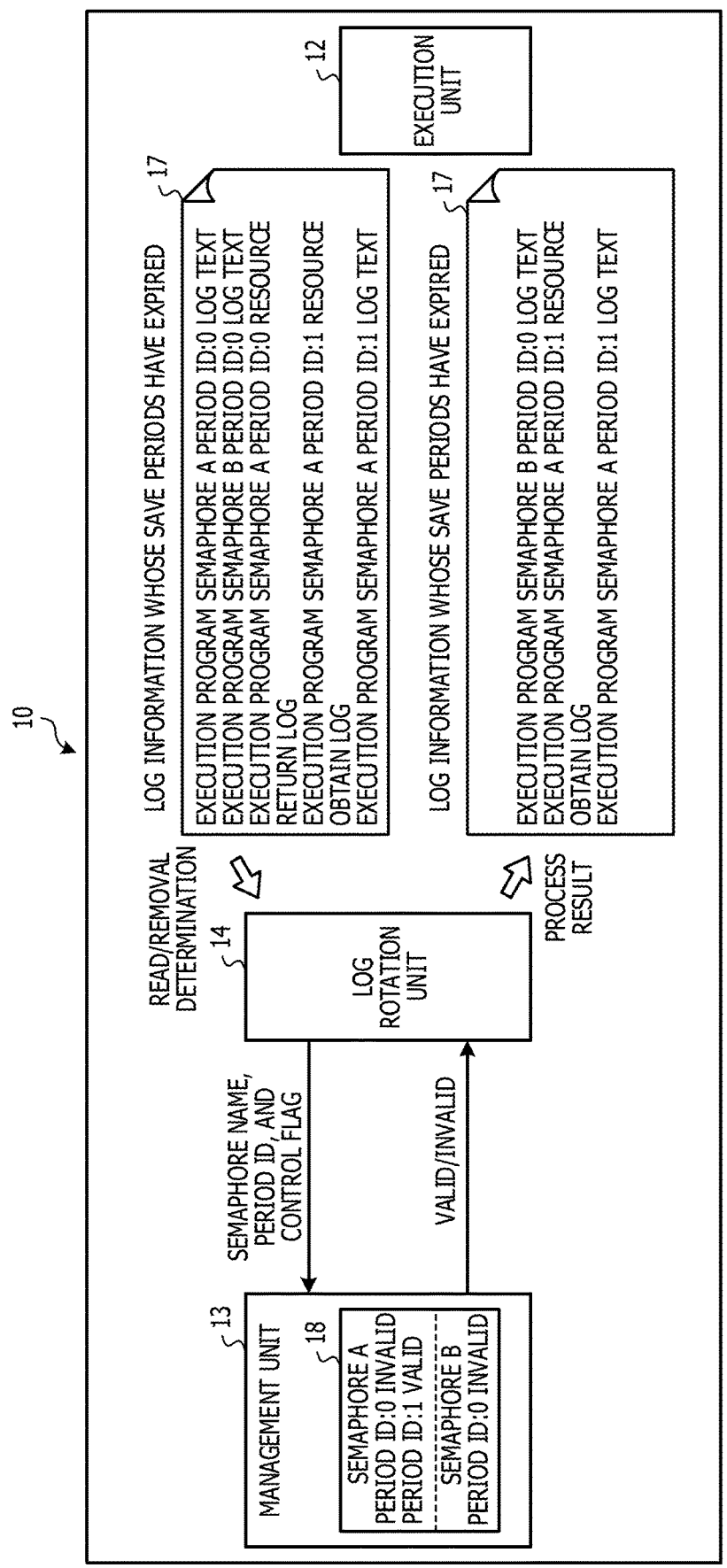
FIG. 10 is a diagram illustrating the example of the log rotation process according to the first embodiment.

Next, an example of the log rotation process according to the first embodiment will be described with reference to FIGS. 9 and 10. FIG. 9 is a flowchart illustrating an example of the log rotation process according to the first embodiment. FIG. 10 is a diagram illustrating an example of the log rotation process according to the first embodiment.

The log rotation unit 14 operates independently of the execution unit 12 and the management unit 13. The log rotation unit 14 operates each time a certain period of time has elapsed, and selects, as removal candidates, log information stored in the log file 17 whose save periods have expired. The log rotation unit 14 does not remove a removal candidate whose period ID is valid and removes a removal candidate whose period ID is invalid. The log rotation unit 14 thus removes log information irrelevant to an analysis of a possible malfunction and does not remove log information to be used to analyze a possible malfunction.

More specifically, in the process illustrated in FIG. 9, which is performed each time the certain period of time has elapsed, the log rotation unit 14 checks the log file 17 and selects log information whose save periods have expired as removal targets (step S120). Next, the log rotation unit 14 sets "period ID validity checked" to a control flag and transmits, to the management unit 13, a semaphore name, a period ID, and the control flag ("period ID validity checked") corresponding to an execution program name of the selected log information (step S121).

The management unit 13 obtains the semaphore name, the period ID, and the control flag ("period ID validity checked") transmitted from the execution unit 12 (step S112). Next, the management unit 13 refers to the management table 18 and notifies the execution unit 12 whether the period ID corresponding to the transmitted semaphore name is invalid (step S113).

The management unit 13 determines whether the period ID corresponding to the semaphore name is invalid based on the value of the period ID stored in the management table 18. That is, the management unit 13 determines that, among period IDs of the semaphore name stored in the management table 18, a period ID smaller than a latest period ID is invalid and that a period ID equal to or larger than the latest period ID is valid.

The log rotation unit 14 determines whether the transmitted period ID is invalid (step S122). If the period ID is invalid, the log rotation unit 14 removes log information corresponding to the period ID (step S123) and proceeds to step S125.

If determining that the transmitted period ID is valid, on the other hand, the log rotation unit 14 proceeds to step S125 without removing the log information corresponding to the period ID from the log file 17. If the certain period of time has elapsed in step S125, the log rotation unit 14 returns to step S120 and repeats the process in step S120 and later.

In the example illustrated in FIG. 10, the log rotation unit 14 transmits the semaphore name, the period ID, and the control flag ("period ID validity checked") to the management unit 13, and the management unit 13 refers to the management table 18. As a result, when the semaphore name is "semaphore A", the management unit 13 notifies the log rotation unit 14 that a period ID is invalid if the period ID is "0" and that a period ID is valid if the period ID is "1". When the semaphore name is "semaphore B", the management unit 13 notifies the log rotation unit 14 that a period ID is valid if the period ID is "0".

The log rotation unit 14 removes log information illustrated in FIG. 10 whose save periods have expired and whose period IDs are invalid and does not remove log information whose period IDs are valid. As a result, log information corresponding to "semaphore A" and the period ID of "0" is removed, and log information corresponding to "semaphore A" and the period ID of "1" and log information corresponding to "semaphore B" and the period ID of "0" are not removed.

As described above, when a semaphore has returned to an initial value, all resources obtained have been normally returned. That is, when a semaphore has returned to an initial value, log information regarding execution programs 16 that have been executed is history information regarding processes that have been performed normally, and it may be determined that the log information is irrelevant to an analysis of a possible malfunction.

In the information processing apparatus 10 according to the present embodiment, when a semaphore has returned to an initial value, a period ID is increased by one in order to divide log information regarding processes based on the execution programs 16 into a plurality of periods identified with period IDs. When the semaphore has returned to the initial value, period IDs corresponding to log information regarding past job execution programs are invalidated. That is, when a semaphore has returned to an initial value, a period ID is increased by one, and if a period ID is smaller than the new period ID, the period ID is determined to be invalid. Log information corresponding to the invalid period ID is then removed from the log file 17.

As a result, the information processing apparatus 10 according to the present embodiment removes, from the log file 17, log information whose save periods have expired and that is irrelevant to an analysis of a cause of a possible malfunction. Log information to be used to analyze a possible malfunction, therefore, is not removed.

In high performance computing (HPC), in particular, an enormous amount of log information, namely gigabytes of log information, is recorded in one day. In addition, the execution time of an execution program is considerably long. It is therefore likely that log information whose save periods have expired and that has been determined by the log rotation unit 14 as removal targets includes log information that is desired to be kept in case of a malfunction. It is not realistic, however, to save log information permanently or extend save periods of log information because memory capacity for storing log information is limited.

For this reason, in the present embodiment, when log information whose save periods have expired are removed from the log file 17, log information that might be used to analyze a cause of a possible malfunction is not removed as described above, and a cause of a possible malfunction can be identified more promptly.

Second Embodiment

As described above, in the first embodiment, the execution unit 12, the management unit 13, and the log rotation unit 14 operate at the same node. In the second embodiment, on the other hand, the execution unit 12, the management unit 13, and the log rotation unit 14 operate in combination with one another at different nodes.

Figure 11:
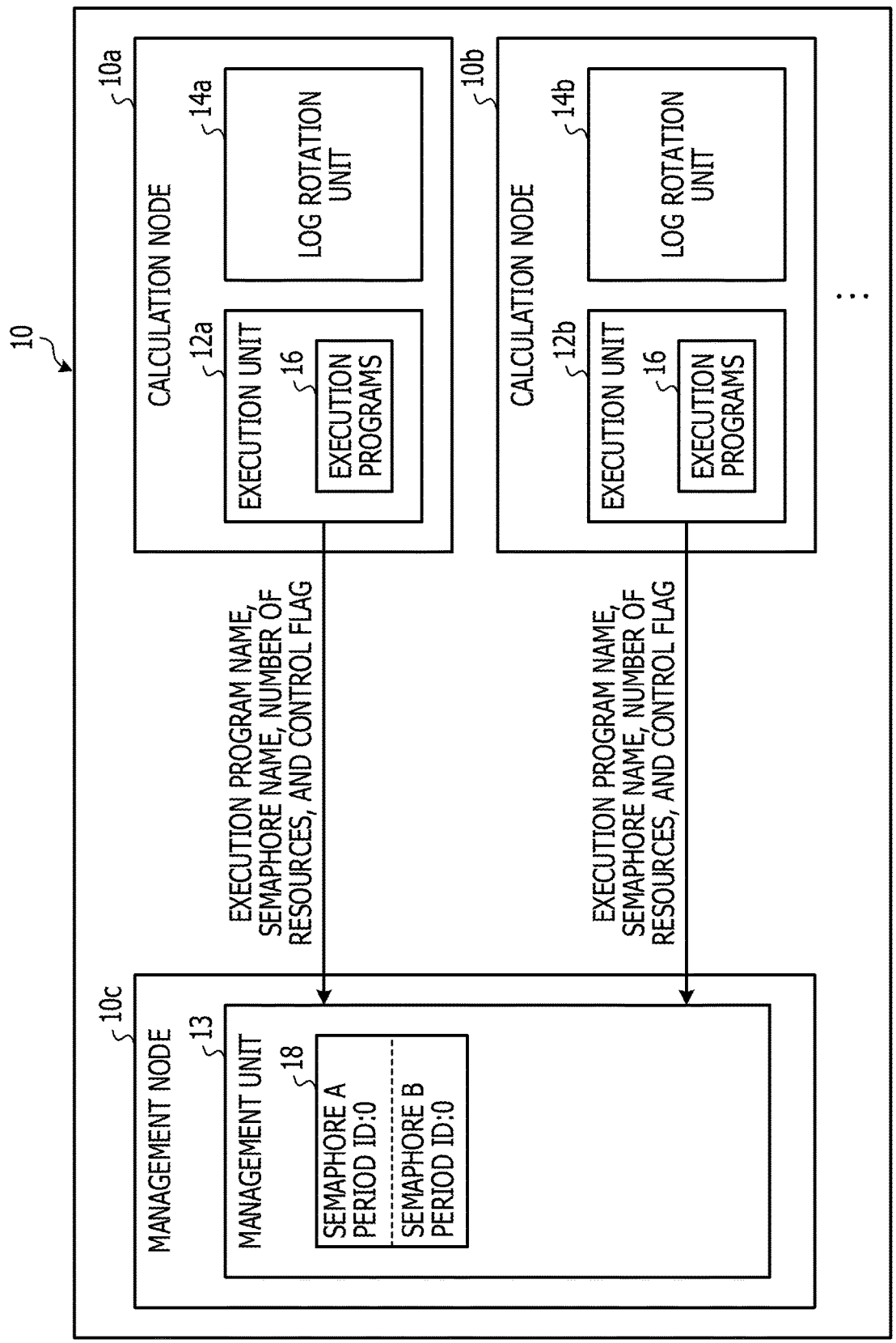
FIG. 11 is a diagram illustrating an example of a process at a time of generation of a semaphore according to the second embodiment.

The execution programs 16 may operate in parallel with one another. As illustrated in FIG. 11, for example, a plurality of execution units 12*a* and 12*b* may execute the execution programs 16 in parallel with each other. In this case, a calculation node 10*a* including the execution unit 12*a*, a calculation node 10*b* including the execution unit 12*b*, and a management node 10*c* including the management unit 13 are different nodes and operate in combination with one another. In addition, in the present embodiment, log rotation units 14*a* and 14*b* are provided for the calculation nodes 10*a* and 10*b*, respectively. In the present embodiment, a system 100 including the calculation nodes 10*a* and 10*b* and the management node 10*c* is used instead of the information processing apparatus 10 according to the first embodiment.

In an example of a process at a time of generation of a semaphore according to the second embodiment illustrated in FIG. 11, the execution units 12*a* and 12*b* of the calculation nodes 10*a* and 10*b* transmit execution program names, semaphore names, the number of resources, and control flags to the management unit 13 of the management node 10*c*. The management unit 13 singlehandedly manages period IDs of semaphores using the management table 18.

Figure 12:
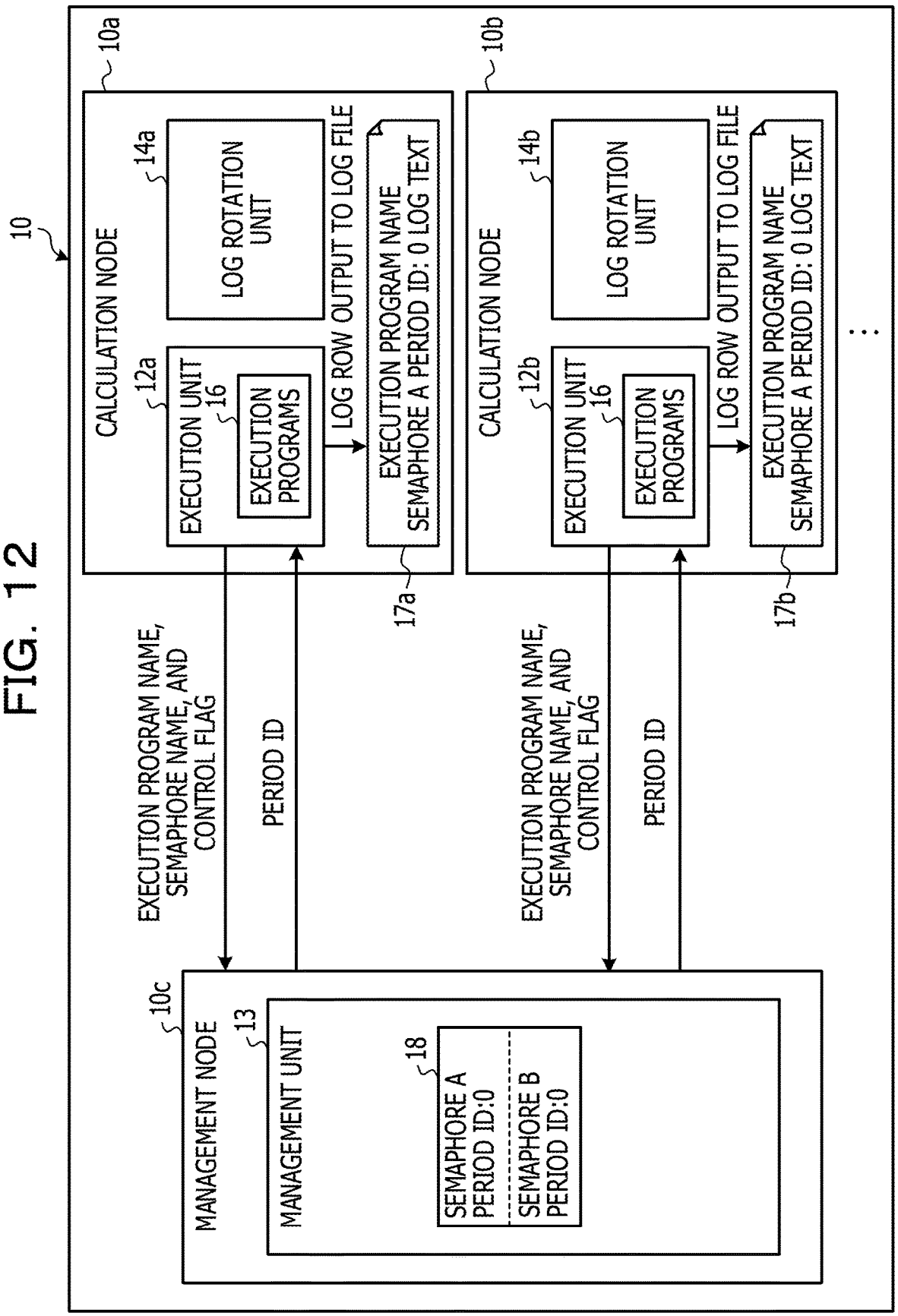
FIG. 12 is a diagram illustrating an example of a process at a time of outputting of a log according to the second embodiment.

In an example of a process at a time of outputting of a log according to the second embodiment illustrated in FIG. 12, the execution units 12*a* and 12*b* of the calculation nodes 10*a* and 10*b* transmit execution program names, semaphore names, and control flags to the management unit 13. The management unit 13 transmits corresponding period IDs to the execution units 12*a* and 12*b*. The execution units 12*a* and 12*b* store the period IDs in log files 17*a* and 17*b* while associating the period IDs with the semaphore names. The log files 17*a* and 17*b* may be separately provided for the calculation nodes 10*a* and 10*b*, respectively, or may be common to the calculation nodes 10*a* and 10*b*.

Figure 13:
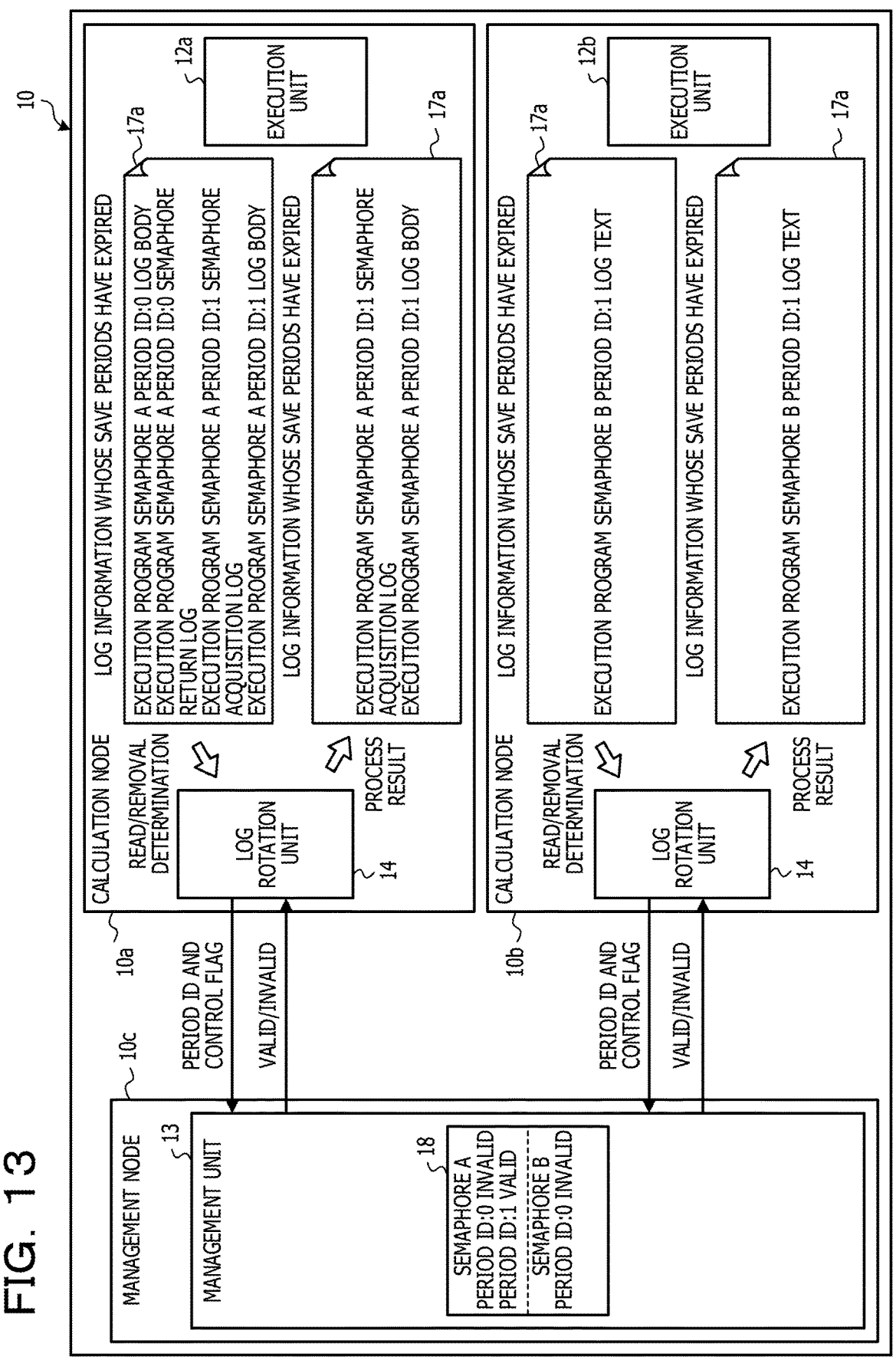
FIG. 13 is a diagram illustrating an example of a log rotation process according to the second embodiment.

In an example of a log rotation process according to the second embodiment illustrated in FIG. 13, the log rotation units 14*a* and 14*b* operate each time a certain period of time has elapsed. The log rotation units 14*a* and 14*b* select log information that has been output to the log files 17*a* and 17*b* and whose save periods have expired as removal candidates. FIG. 13 illustrates an example of the log information whose save periods have expired and that has been selected as removal candidates.

If a period ID stored in association with log information that has been selected as a removal candidate is valid, the log information is not removed. If a period ID stored in association with log information that has been selected as a removal candidate is invalid, on the other hand, the log information is removed. As a result, log information to be used to analyze a cause of a possible malfunction is not removed.

When a plurality of calculation nodes execute the execution programs 16 in parallel with each other, the plurality of calculation nodes might execute associated job execution programs 16. In this case, a state of another calculation node has to be taken into consideration when log information is removed.

That is, in the present embodiment, if a job execution program 16 employing the semaphore A executed by the calculation node 10a and a job execution program 16 employing the semaphore B executed by the calculation node 10b are associated with each other, and if all period IDs corresponding to log information regarding associated jobs are invalid, the log information corresponding to the period IDs is removed.

That is, in the example illustrated in FIG. 13, when a period ID of "0" corresponding to the semaphore B stored in the management table 18 has become invalid, all period IDs of "0" corresponding to the log information regarding the associated jobs are determined to be invalid, and the log information corresponding to the period IDs is removed.

With the system 100 according to the present embodiment, even when pieces of log information are associated with each other when different calculation nodes execute associated job execution programs 16 in parallel with each other, log information that might be used to analyze a cause of a possible malfunction is not removed. As a result, the cause of the possible malfunction is identified promptly.

The job scheduler or the like notifies in advance the execution unit 12, the management unit 13, or the log rotation unit 14 whether the job execution program 16 employing the semaphore A executed by the calculation node 10a and the job execution program 16 employing the semaphore B executed by the calculation node 10b are associated with each other.

Although the information processing apparatus, the log management program, and the log management method have been described based on the embodiments, the information processing apparatus, the log management program, and the log management method herein are not limited to those according to the above embodiments and may be modified or improved in various ways without deviating the scope of the present technology. The above embodiments may be combined with each other insofar as contradictions are not caused.

The configuration of the information processing apparatus 10 and the system 100 according to the above embodiments are examples and do not limit the scope of the present technology. Various examples of the configuration are possible depending on usage and purposes. The system 100, for example, may include three or more calculation nodes. In addition, in the system 100, the management node may be provided inside the plurality of calculation nodes.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A log management apparatus comprising:
   a memory configured to store log information and identification information in association with each other; and
   a processor coupled to the memory and the processor configured to:
   store, in association with first identification information in the memory, first log information output, before a semaphore returns to an initial value but after the semaphore decreases from the initial value, from a program employing the semaphore;
   associate the first identification information with information relative to deletion of the log information when the semaphore has returned to the initial value; and
   perform deletion of the first log information among the log information stored in the memory in accordance with the first identification information associated with the information.

2. The log management apparatus according to claim 1, wherein the information indicates permission to delete log information.

3. The log management apparatus according to claim 1, wherein the processor further configured to store, in association with second identification information in the memory, second log information output, before the semaphore re-returns to the initial value but after the semaphore re-decreases from the initial value after the semaphore has returned to the initial value once, from the program employing the semaphore.

4. The log management apparatus according to claim 1, wherein the deletion includes,
   specifying the first identification information associated with the information from among the identification information; and
   specifying the first log information associated with the first identification information from among the log information stored in the memory as object of the deletion.

5. The log management apparatus according to claim 1, wherein the deletion is executed when save period of the first log information has expired.

6. The log management apparatus according to claim 1,
   wherein the processor further configured to store, in association with second identification information in the memory, second log information output, before another semaphore returns to another initial value but after the other semaphore decreases from the other initial value, from another program employing the other semaphore, the other program relating to the program, and
   wherein the deletion is executed when both the first identification information and the second identification information are associated with the information.

7. A log management method by a computer, the method comprising:
   storing, in association with first identification information in a memory, first log information output, before a semaphore returns to an initial value but after the semaphore decreases from the initial value, from a program employing the semaphore;

associating the first identification information with information relative to deletion of the log information when the semaphore has returned to the initial value; and deleting the first log information among log information stored in the memory in accordance with the first identification information associated with the information.

8. The log management method according to claim 7, wherein the information indicates permission to delete log information.

9. The log management method according to claim 7, further comprising: storing, in association with second identification information in the memory, second log information output, before the semaphore re-returns to the initial value but after the semaphore re-decreases from the initial value after the semaphore has returned to the initial value once, from the program employing the semaphore.

10. The log management method according to claim 7, wherein the deleting includes,
- specifying the first identification information associated with the information from among the identification information; and
- specifying the first log information associated with the first identification information from among the log information stored in the memory as object of the deleting.

11. The log management method according to claim 7, wherein the deleting is executed when save period of the first log information has expired.

12. The log management method according to claim 7, further comprising: storing, in association with second identification information in the memory, second log information output, before another semaphore returns to another initial value but after the other semaphore decreases from the other initial value, from another program employing the other semaphore, the other program relating to the program, wherein the deleting is executed when both the first identification information and the second identification information are associated with the information.

13. A non-transitory computer-readable medium storing a log management program that causes a computer to execute a process comprising:

storing, in association with first identification information in a memory, first log information output, before a semaphore returns to an initial value but after the semaphore decreases from the initial value, from a program employing the semaphore;

associating the first identification information with information relative to deletion of the log information when the semaphore has returned to the initial value; and deleting the first log information among log information stored in the memory in accordance with the first identification information associated with the information.

* * * * *